(12) United States Patent
Herter et al.

(10) Patent No.: US 7,606,162 B2
(45) Date of Patent: Oct. 20, 2009

(54) TRACKING OF PROCESS-RELATED COMMUNICATION

(75) Inventors: Klaus Herter, Leimen (DE); Wolfram Siefke, Heidelberg (DE); Jens Staeck, Sandhausen (DE)

(73) Assignee: SAP AG, Walldorf (DE)

( * ) Notice: Subject to any disclaimer, the term of this patent is extended or adjusted under 35 U.S.C. 154(b) by 902 days.

(21) Appl. No.: 11/027,565

(22) Filed: Dec. 30, 2004

(65) Prior Publication Data

US 2006/0146727 A1 Jul. 6, 2006

(51) Int. Cl.
*H04L 1/00* (2006.01)
(52) U.S. Cl. .................. 370/241; 370/252; 370/310; 340/572.4; 705/10; 705/37; 705/39
(58) Field of Classification Search .................. None
See application file for complete search history.

(56) References Cited

U.S. PATENT DOCUMENTS

| | | | |
|---|---|---|---|
| 6,170,011 B1 | 1/2001 | Macleod Beck et al. | 709/224 |
| 6,266,525 B1 * | 7/2001 | Peterson | 455/410 |
| 2003/0051026 A1 * | 3/2003 | Carter et al. | 709/224 |
| 2003/0154144 A1 | 8/2003 | Pokorny et al. | 705/28 |
| 2005/0005009 A1 * | 1/2005 | Takahashi et al. | 709/224 |

FOREIGN PATENT DOCUMENTS

| | | |
|---|---|---|
| WO | WO 98/01838 | 1/1998 |
| WO | WO 2004/090770 | 10/2004 |

* cited by examiner

*Primary Examiner*—Chi H. Pham
*Assistant Examiner*—Shick Hom
(74) *Attorney, Agent, or Firm*—Schwegman, Lundberg & Woessner, P.A.

(57) ABSTRACT

The disclosure relates to tracking process-related communications between at least two members. To allow project planning, the invention provides a method in which communication events between the members are monitored. Communication information is determined from the monitored communication event, and from the communication information selected communication event information is extracted, such as, for example process information and member information related to the communication event. The selected communication event information is stored.

21 Claims, 7 Drawing Sheets

| Event ID | Process ID | Member 1 | Member 2 | Time | Duration | Means | Location |
|---|---|---|---|---|---|---|---|
| 1 | 123 | ABC | XYZ | 10:00 | 5 | Telephone | n.a. |
| 2 | 123 | XYZ | EFG | 14:00 | 25 | Personal | Room 5 |
| 3 | 123 | GHR | TRF | 21:15 | 3:25 | Database | n.a. |
| ... | ... | ... | ... | ... | ... | ... | ... |

TRACKING OF PROCESS-RELATED COMMUNICATION

TECHNICAL FIELD

The disclosure relates in general to tracking of process-related communication.

BACKGROUND

Today, most work is done in business processes and projects, with a plurality of people participating and working together as a team. For example, in product development, team members can be technicians, programmers, product designers, sales persons and marketing experts. Another example can be customer support, where customers can be supported by key account managers, technicians, sales persons and others, if necessary.

The projects and business processes can be described in general as processes. Within the processes, the team members communicate with each other. This communication can happen using various different means of communication. This means of communication can be, among others, personal communication between the team members, but also communication using telephones, emails, web-conferences, video conferences, and the like.

The members of communication need not necessarily be humans. It can also be possible that a member of communication can be a database, which is interrogated by the team members from time to time to obtain certain pieces of information. Members can, for example, also be certain computer applications or programs used by the team members during their work, or certain web applications, such as online dictionaries, online registers, or the like.

Each time members of a communication initiate a communication this can be regarded as a communication event. A communication event can represent one particular communication occasion. For example, when two team members have a phone conference, they initiate a communication event, which can be of the type "phone conference." Another example can be a video conference, attended by a plurality of persons. This one video conference can also be regarded as a communication event, which can be of the type "video conference." As another example, an email can also be regarded as a communication event, which can be of the type "email." Moreover, each time a user checks an online dictionary for a particular word, he can create a communication event, which can be of the type "web access."

Communication events can be generated each time at least two members interact with each other. These communication events can be electronically-supported communication or personal communication.

It is common knowledge that email traffic can be monitored using an email server. Within this email server, all incoming and outgoing emails can at least be scanned for retrieving author and recipient information. It is also possible to store the email for each person individually. In addition, the emails can comprise project-related information either within the subject line, or within the text body of the mail. Known tools allow scanning emails for certain words or strings within the subject line or within the text body. This enables users to organize email traffic into folders, having an overview of the emails concerning particular topics and thus being enabled to track certain communication threads. It can also be possible to provide an automatic screening tool to organize all email traffic having particular strings in the subject line automatically into respective folders generating an overall overview of email traffic relating to the topic as indicated in the subject line. The screening can also be done selectively by person, e.g., by screening email traffic of particular persons. The screening, however, needs to be configured manually.

It is also known to have a central telecommunication server. This central telecommunication server can be able to keep track of all incoming, outgoing, and internal telephone communication. The communication events generated by the phone calls can be stored as entries in databases and can be assigned to respective extension lines. This enables tracking of telephone communications on one particular extension line.

However, communication between members of a process is more complex than just email or telephone. Members of a team interact with each other using various different means of communication. With known methods and systems it is possible to monitor the communication via only one particular communications means; however, an integrated tracking of communication between members is not possible.

As indicated earlier, most business communication happens related to projects and processes. Many different members participate in a project and communicate with each other. For a project manager, it would be helpful to have an overview of all communication that is related to the process he manages. The process manager might want to analyze communication and might use this information for staffing of future projects. Replacement of team members during the course of a continuing project may result in lost information. In order to let the new member of the team have knowledge of previous communications, it may be useful to know the communication partners and frequency of communication of the previous team member.

SUMMARY

To solve one or more of these problems, one embodiment provides a system for tracking process-related communication between at least two members communicating with each other. The system includes a central monitoring unit that monitors communication events between the members and determines communication information from the monitored communication event. A tracking unit extracts from the communication information selected communication event information related to the communication event such as, for example, member information and process information. A storage unit stores the selected communication event information.

A communication event occurs when at least two members communicate with each other. This communication event can be provided to the central monitoring unit. The central monitoring unit can be a central server or any other central computer capable of monitoring communication events from different sources. The central monitoring unit can provide different interfaces, each of which is capable of receiving information about communication events from different means of communication, or from any other data source.

The central monitoring unit determines from the monitored communication events communication information. Communication information can at least be the members of the communication involved in the communication event and the process to-which the communication event is related.

The tracking unit extracts from the communication information selected communication event information such as, for example, the members involved in the communication and the process related to the communication event. The tracking unit can be, for example, a parser for parsing the communication information, which can, for example, be provided by the monitoring unit in a uniform format. The tracking unit can also be an interpreter for interpreting the communication information. The tracking unit can be arranged to extract all necessary data from the communication information.

After having extracted the relevant communication event information data from the communication information, this data can be stored in a storage unit. It has been found useful to store the communication information by related processes. This results in automatically storing for each process the related communication events. For each member of a communication, the communication event can be stored by its related processes. A member of a communication can, for example, work for different processes. Thus, it can be necessary to store the process to which the respective communication event was related.

According to one embodiment, the tracking unit extracts from the communication information role information of the members involved in the communication event, and the storage unit is arranged for storing, by related processes, role information of the members involved.

According to one embodiment, the storage unit is arranged for storing for a process an n-dimensional matrix comprising at least information about members and communication events transpiring between the corresponding members.

The tracking unit is arranged for extracting from the communication information the length of the communication event and the storage unit is arranged for storing, by related processes, the length of the communication event, according to one embodiment.

According to one embodiment, the storage unit is arranged for storing a frequency of communication events occurring between members.

The tracking unit is arranged for extracting from the communication information the type of communication event, and the storage unit is arranged for storing the type of communication event, according to one embodiment. The type of communication can be, according to one embodiment, telephone communication, email communication, intercommunication between programs and persons, web communication, or personal communication. Other means of communication are also within the scope of this embodiment.

Members of a communication event can be, according to one embodiment, persons, programs, web applications, databases, or the like.

A visualization unit is provided according to one embodiment, with the visualization unit arranged for determining from the storage unit the stored process-related communication events together with at least the member information. The visualization unit is arranged for providing an overview of the process-related communication, according to one embodiment. According to one further embodiment, the visualization unit is arranged for visualizing the members involved in communication for a particular process and the intercommunication between the members. According to one embodiment, the visualization unit is arranged for visualizing the intercommunication between the members depending on at least one of the frequency of communication between the respective members and the type of communication between the respective members.

According to one embodiment, members that are persons are provided with mobile identification units arranged for automatically identifying the person during personal communication. The mobile identification units are arranged for synchronizing automatically with each other, according to one embodiment. The mobile identification units are arranged for receiving location information and for storing the location information together with the communication information, according to one embodiment. The mobile identification units can be radio frequency identification units or Bluetooth communication units or any other wirelessly accessible identification units, according to one embodiment.

According to one embodiment, at least one interrogator arranged for interrogating the mobile identification units for retrieving at least the stored communication information is provided. According to one embodiment, the interrogator forwards automatically at least the retrieved communication information to the monitoring unit.

Another aspect is a method for tracking process-related communication between at least two communication members; automatically monitoring communication events between the members and determining communication information from the monitored communication event; automatically extracting from the communication information selected communication event information such as, for example, at least the members involved in the communication event and a process related to the communication event; and, storing, by related processes, the communication event together with the members involved.

A further aspect is a computer program product tangibly embodied in an information carrier, the computer program product comprising instructions that, when executed, cause at least one processor to perform operations comprising the following: monitoring communication events between the members and determining communication information from the monitored communication event; extracting from the communication information at least the members involved in the communication event and a process related to the communication event; and, storing, by related processes, the communication event together with the members involved.

Referring now to the drawings, in which like numerals represent like elements throughout the several figures, aspects of the present invention and the exemplary operating environment will be described.

BRIEF DESCRIPTION OF THE DRAWINGS

In the Figures:

FIG. 6 is a matrix for storing communication information according to one embodiment; and, FIG. 7 is a communication event according to one embodiment.

DETAILED DESCRIPTION

In FIGS. 1-7, while reference numbers 100/200, 110/210, etc., denote similar elements, the function of these elements can be different.

Figure 1:
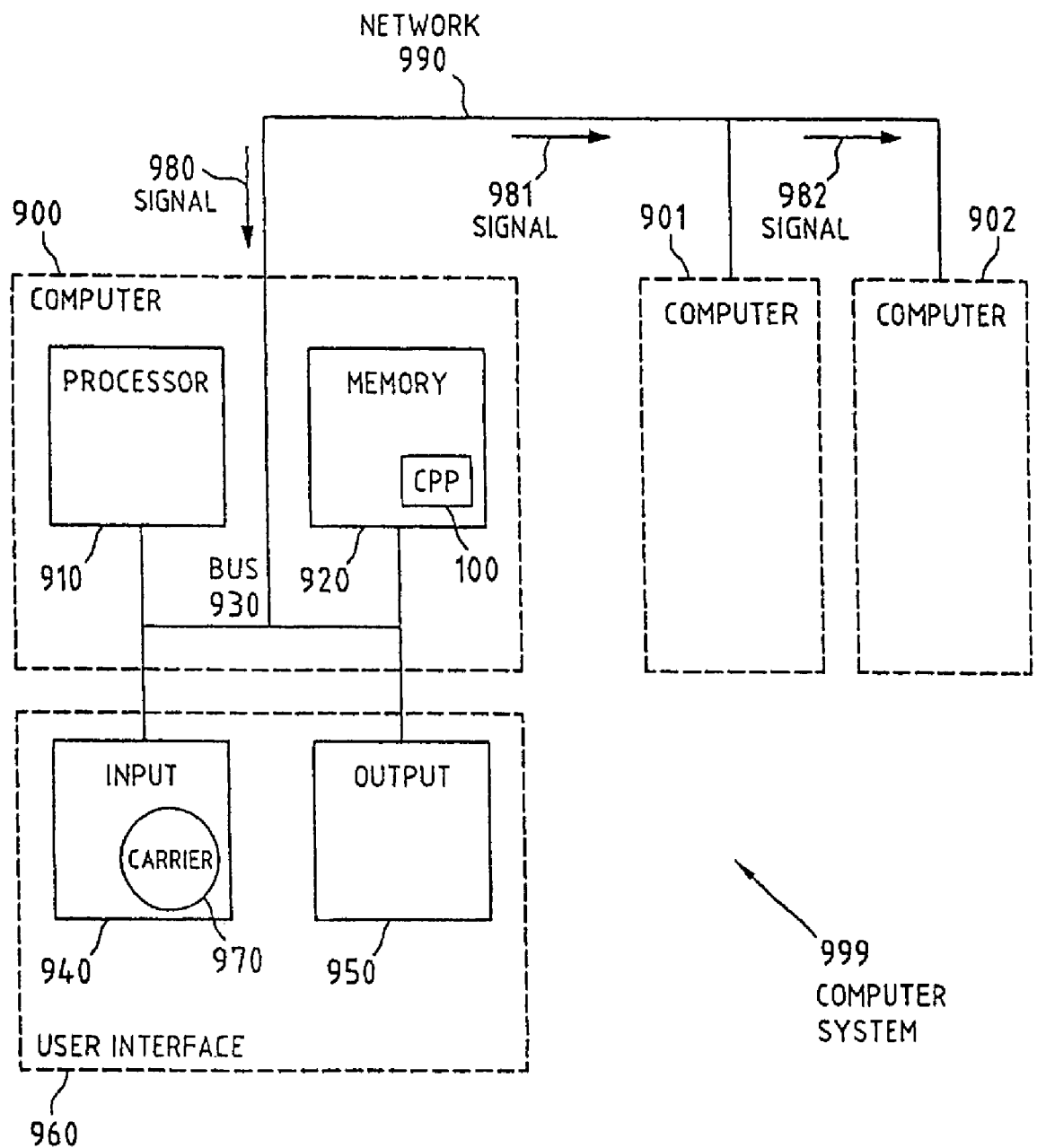
FIG. 1 is an illustration of a computer system for implementing an inventive system, according to one embodiment.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

In respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a mini-computer, a mainframe computer, a personal mobile computing device, a mobile phone, a portable or stationary personal computer, a palmtop computer or the like. Processor 910 is, for example, a central processing unit (CPU), a micro-controller unit (MCU), digital signal processor (DSP), or the like.

Memory 920 is an element that temporarily or permanently stores data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that is operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, (cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web WWW). Network 990 can be a wired or a wireless network. To name a few network implementations, network 990 can be, for example, a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

A variety of transmission protocols, data formats and conventions is known, for example, as transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

As used hereinafter, phrases, such as "the computer provides" and "the program provides," are convenient abbreviations to express actions by a computer that is controlled by a program.

Figure 2:
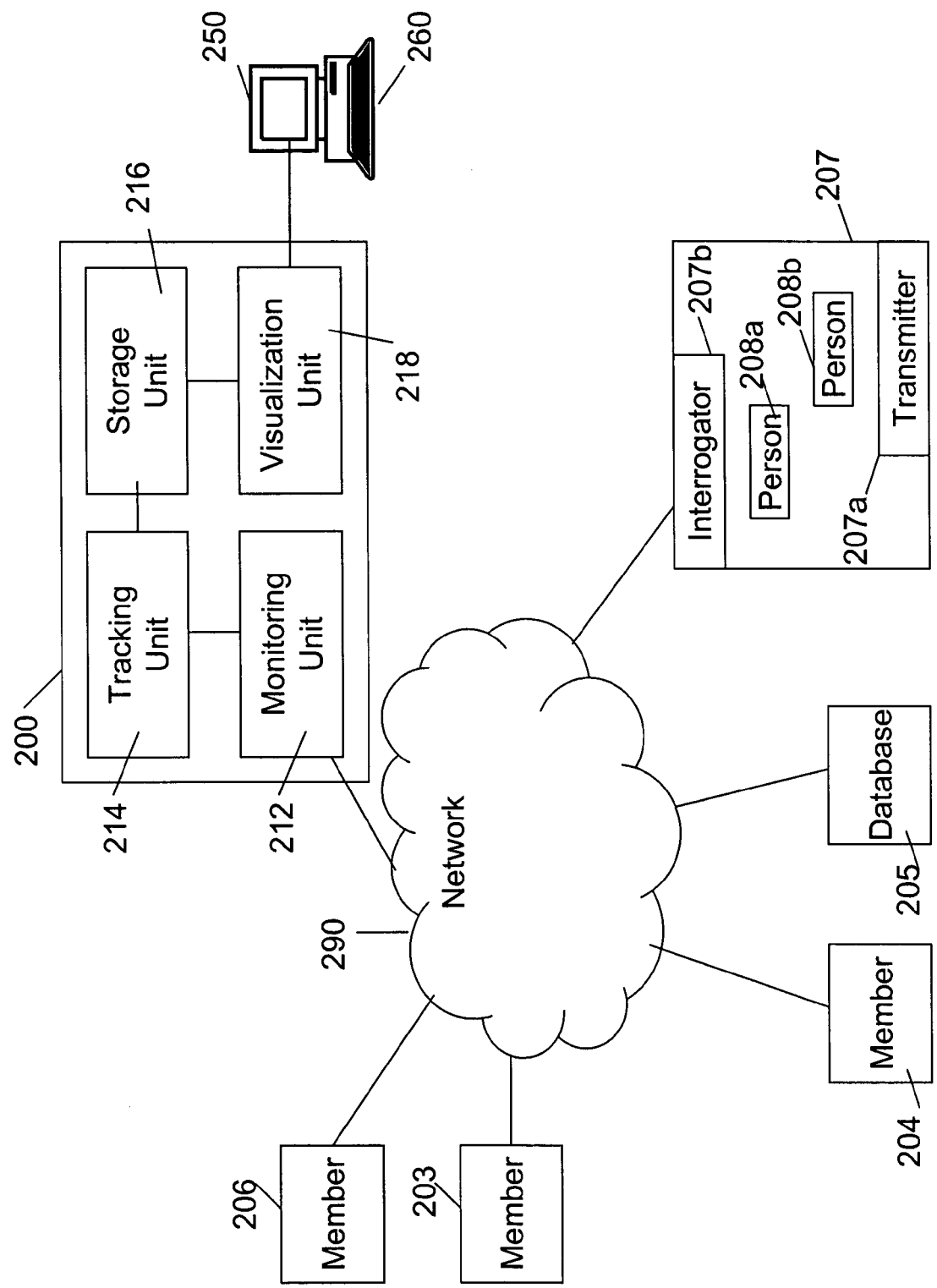
FIG. 2 is an illustration of another computer system arranged for implementing an inventive system, according to one embodiment.

FIG. 2 illustrates an implementation of an inventive system 200. Illustrated are a network 290, communication members 203, 204, 205, 206, 208 and a system 200 for tracking process related communication.

The network 290 allows different types of communication between the communication members 203, 204, 205, 206. Each communication creates a communication event. The communication can be done via telephone, email, web-conference, video conference, instant message or any other method of communication. For example, member 203 can have a communication with member 204 via telephone. In another example, member 204 can have a communication with member 206 via email. An example of a communication event is illustrated in FIG. 7.

Figure 7:
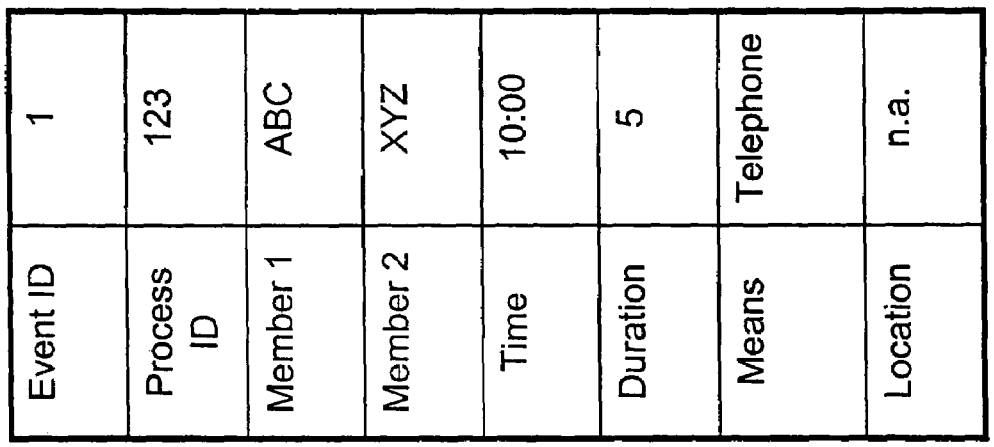

In FIG. 7 a communication event 700 is illustrated. Within this communication event 700, a unique event ID is stored. Also, each communication event stores a process ID, identifying a process to which the communication was related. In addition, the members involved in the communication are stored, as well as the time, duration, and means of communication. The location can also be stored; however, no location is stored in the illustrated event.

Member 205 can be a database, such as an online dictionary. This member 205 can be used by the other members 203, 204, 206, 208. For example, member 204 can interrogate database 205 to obtain a particular piece of information. This creates a communication event as well.

In addition, communication can happen directly between persons 208a, 208b. The communication can happen within a meeting room 207.

For example, the persons 208a, 208b can be provided with radio frequency identification (RFID) units. The persons involved in a communication event can thus be identified. The persons can also specify which process they are working for. This can, for example, be coded on the mobile RFID units. The RFID units allow identifying the persons 208 automatically during communication. When the persons 208 communicate with each other, the RFID units synchronize themselves automatically to provide consistent information. Information about the communication event can be stored on the identification units. This provides automatically monitoring of even personal communication. This synchronization can cause both RFID units to store the same information about the communication event. This can be a unique identifier of the communication event, the persons 208 involved, the duration of communication and the location 207 of the communication.

Location information can be transmitted by transmitters 207a arranged in a room 207 or other location in which communication occurs such as, for example, a meeting area. The RFID units can receive this location information and can store this information together with the communication event. The location information allows tracking communication with local information. For example, process managers can plan which meeting rooms will be required for future projects, which allows better estimating the costs of future projects.

The RFID units can be automatically read by the interrogator 207b, arranged in the room 207. The interrogator 207b is capable of interrogating the RFID units to retrieve at least the stored communication information. The interrogator 207b is arranged to forward automatically at least the retrieved communication information to the central server 200. The retrieved communication information can thus be forwarded to a monitoring unit automatically. Advantageously, this may relieve users 208 of, for example, manually updating a time sheet or sending a message to a controller about a communication.

The method of communication, as described above, can also provide communication information about communication events to the central server 200.

The process to which the communication was related can be extracted automatically, e.g., in case of an email, from the subject line or the text body, or for example, in case of telephone communication, by requesting the users to enter a process code. Another possibility of identifying the process can be to determine the processes to which the communication members belong and to search for the processes, which all or most of the involved members in a communication have in common. This process can then be considered to be the process related to the respective communication.

All communication information for communication events are reported to the central server 200. Central server 200 comprises a monitoring unit 212, a tracking unit 214, a storage unit 216 and a visualization unit 218.

The monitoring unit 212 is arranged for automatically monitoring communication events between the members 203, 204, 205, 206, 208. The monitored communication events can be used to determine communication information. Each communication event includes at least a unique identifier of the communication, member information of the members involved in the communication, and process information regarding the process to which the communication was related. Additional information can be the location of the communication, the means of communication, the time and length of communication, the date of communication, the working time, the season, etc.

The tracking unit 214 receives the communication information from the monitoring unit 212 and automatically extracts from the communication information selected communication event information including, for example, process information and member information related to the communication event. The information indicating which members were involved in which communication event and for which process allows qualified planning of future processes.

Moreover, members in a process can have a role assigned. The role represents the position and tasks of the members in the process. To enable tracking of the communication events, the communication information provided with a communication event can also include role information. The tracking unit 214 can thus be arranged for extracting from the received communication information role information of the members involved in the communication event. This role information can be used to store the communication by its related roles and processes.

For example, to preserve privacy and protect data, the tracking unit may be programmed to ignore the names of persons involved in the communication. Each member in a process can be assigned a role. For example, a person can be project manager, another person can be programmer, a further person can be technician, etc. All the different roles can be assigned to the members of a process. Thus, the tracking unit can extract the role information from the communication information. The role information can be stored together with the communication event. This allows for determining which roles had which communications in which processes. This anonymous analysis enables role-based project planning for future processes. It can be determined which roles in a team communicated with each other. This allows resolving location problems by placing members with the respective roles having more frequent communication preferably spatially closer to one another than members with infrequent communication.

The tracking unit 214 can also be arranged for extracting from the communication information the length of the communication events, the frequency of communication, or the types of communication events. The frequency and/or length of communication between members allows determining the importance of the relationship between members. The more often two members communicate with each other, the more likely the relation between these two members is important in the course of the monitored process. The length of communication information can allow analyzing the communication process in more depth. The longer a communication event lasts, the more highly the communication event can be ranked, based on importance.

The results from the tracking unit can be forwarded to the storage unit 216, which stores selected aspects of the communication event information related to the communication event such as, for example, process information and member information. Within the storage unit, for each process the relevant communication events can be stored. The storage unit can also be arranged for storing the communication information by its related process phases. A process can be divided into different phases. Between the phases, the intercommunication between the members can change. Storing the intercommunication between the members by related phases allows a phase-related analysis of a process.

The intercommunication between members or the respective roles can be stored in an n-dimensional matrix. This matrix contains information about which member communicated with which other member. This matrix can be a cross matrix, storing for each member the communication events with each other member. For each process a single matrix can be created. Because more information can be stored in conjunction with intercommunication, the matrix can be n-dimensional.

FIG. 6 illustrates a matrix 600 which stores the communication information. In this matrix, each communication event is stored in one row. The communication event ID is stored in the first column. To allow identifying the process to which a communication was related, each row also contains a process ID. In the illustrated case, all communication was related to the process 123. It can be possible to store for each process a single matrix. In this case, this column can be omitted.

The involved members, at least identifications of the members, are stored in the next two columns. In addition, the time and duration of the communication are stored in additional columns. The means of communication can be stored. The location of the communication can also be stored. For example, the first row is a representation of the event ID 1. Within this communication event, the communication member ABC communicated with the communication member XYZ at 10:00. The duration of communication was 5 minutes and it was conducted by telephone. The location was not recorded.

Further, the storage unit 216 can store, by related processes, the communication information provided from the tracking unit 214. For each process, the roles involved in intercommunication can be stored. This allows planning of future processes, as the roles can be staffed by certain persons who can be engaged in the process. It is also possible to determine which members have intercommunication during different phases of a process. This allows assigning or withdrawing manpower from processes during certain phases, as it becomes apparent which members might not be involved in the communication at the particular phase.

All stored information needs to be visualized in order to provide a good overview of communication within a process. Thus, a visualization unit 218 is provided. The visualization unit 218 determines from the storage unit the stored process-related communication events together with at least the member information and generates from this information an overview of the communication. The overview can be a pictorial overview, a table, a pictogram, or the like. A possible overview is illustrated in FIGS. 4*a-c* and 5*a-c*.

The output from the visualization unit 218 is provided to a computer user interface 260 with a display 250. The display 250 can be a monitor which illustrates the intercommunication of members involved in a particular process.

Figure 3:
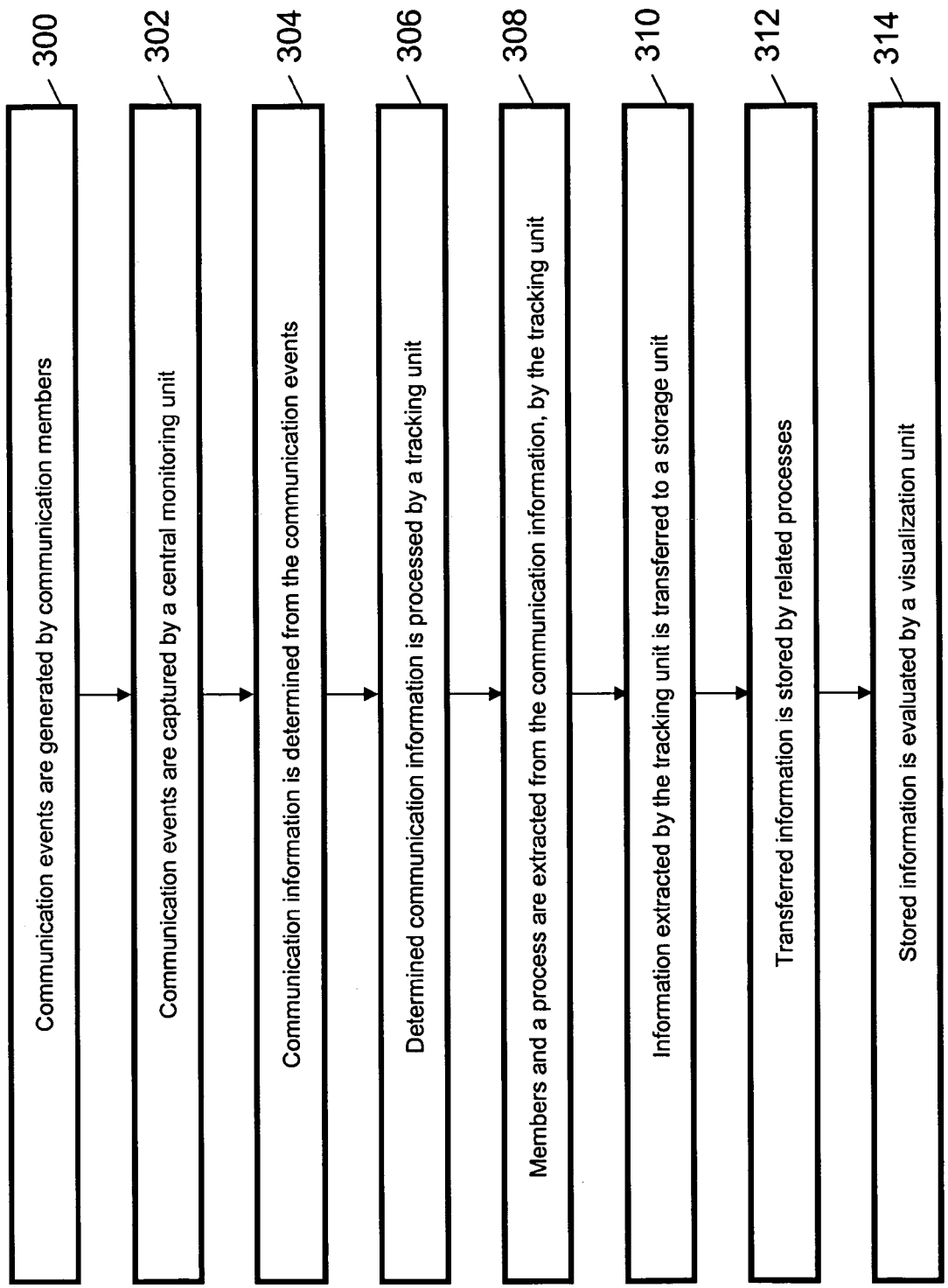
FIG. 3 is a flowchart illustrating a method for tracking process-related communication, according to one embodiment.

FIG. 3 illustrates a flowchart of an inventive method. Illustrated is a method for tracking process-related communication. In case at least two communication members communicate with each other using communication means, they generate communication events 300. The communication events are captured in a central monitoring unit 302. The central monitoring unit is arranged for automatically monitoring communication events between the members. The received communication events are used for determining communication information 304 from the monitored communication events.

The determined communication information is processed 306 by a tracking unit. The tracking unit extracts 308 from the communication information at least the members involved in the communication event and a process related to the communication event.

The process information and the member information and all other information obtained in the tracking unit are transferred 310 to a storage unit. Within the storage unit, the information is stored 312 by related processes. For each process, which members communicated with each other is stored. This can also include the length and frequency of communication between particular members, the role of the members, the type of communication means used or the location of the communication.

The stored information is evaluated 314 by a visualization unit, which provides a pictorial overview of the communication 316 for a particular process, as will be illustrated in FIGS. 4*a-c* and 5*a-c*.

The visualization can be provided such that for each member a dot or point is depicted in a window. The communication between the members can be illustrated by lines between the dots. For example, the strength of a line can depend on the frequency of communication between the respective members. For example, the color of a line can illustrate the means of communication used. The length of a line between members can be inversely proportional to the length of the overall communication between the members, resulting in a short line between members which had long communication and longer lines for members which had short communication. The dots and lines enable determining the communication structure within a process easily.

Figure 4C:
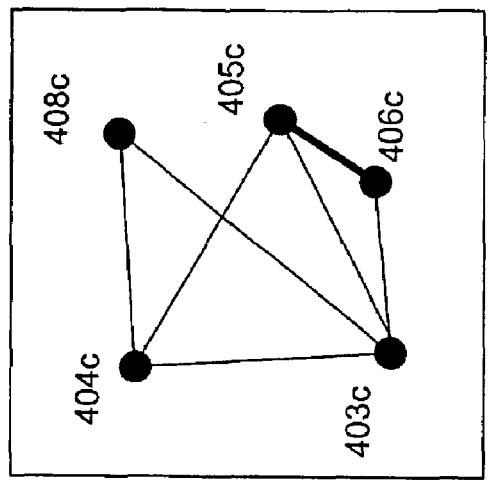
FIGS. 4*a-c* are illustrations of project visualizations of different projects, according to embodiments.
Figure 4B:
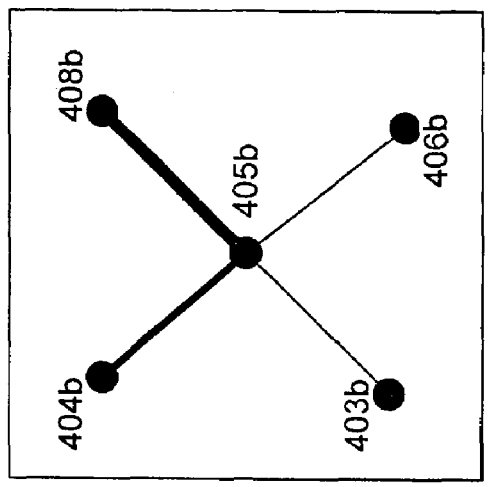
Figure 4A:
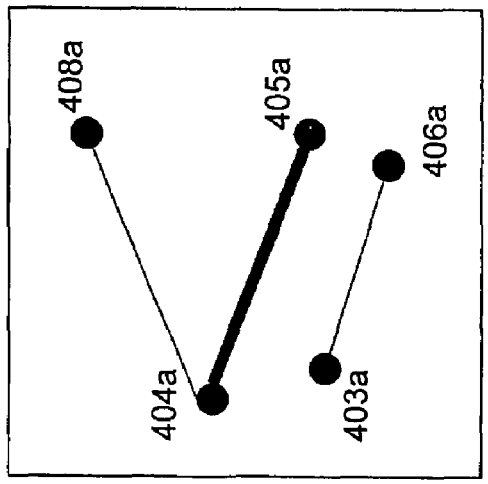

FIG. 4*a* illustrates a screenshot 400 of a pictorial overview of communication between members. Illustrated are members 403*a*, 404*a*, 405*a*, 406*a*, 408*a* as points. These members are all involved in a process. The illustration is process-related and all members of a process can be stored and illustrated together. In case at least one communication event occurred between at least two members 403*a*, 404*a*, 405*a*, 406*a*, 408*a* a single line is drawn between the respective points. The higher the frequency of communication between the members, i.e., the more often two members communicate with each other, the thicker the line is drawn. The duration of communication between members, which can be either the cumulative length or the average length of the communication events, the shorter the lines are, and vice versa. Illustrated in FIG. 4*a* is a process, where the members 404*a* and 405*a* have frequent communication and members 404*a* with 408*a* and 403*a* with 406*a* have sporadic communications.

FIG. 4*b* illustrates a process, where member 405*b* has frequent communication with members 404*b* and 408*b* and sporadic communication with members 403b and 406b. Member 405b is the most important member in the process. Members 403b and 406b do not have any communication with members 404b and 408b, and thus can be spatially separated from each other.

FIG. 4c illustrates a process, where members 405c and 406c have frequent and long communication with each other, indicated by a strong, short line and where the other members 403c, 404c, 408c have occasional, sporadic communication.

Figure 5C:
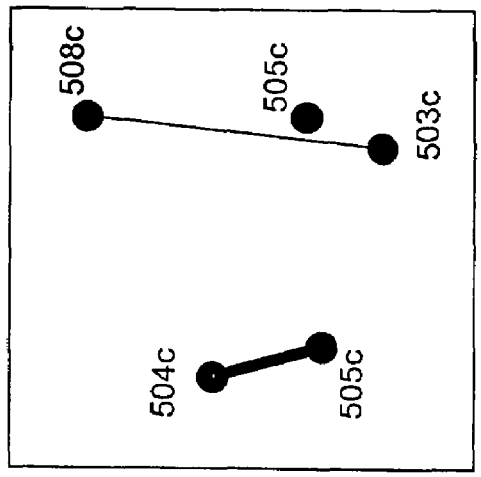
FIGS. 5*a-c* are illustrations of project visualizations for different project phases, according to embodiments.
Figure 5B:
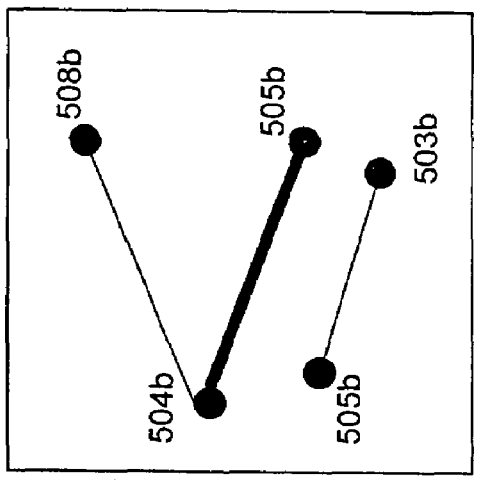
Figure 5A:
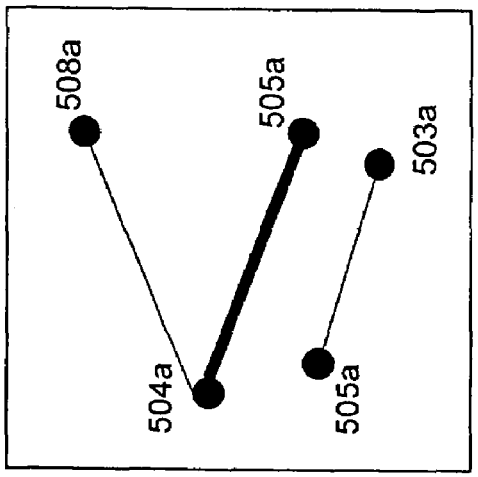

FIGS. 5a-c illustrate the communication between members 503, 504, 505, 506, 508 during different phases of a process. Between the phases illustrated in FIGS. 5a and b, the communication has not changed. There is occasional communication between the members.

With the change to a different phase of the process, as illustrated by FIG. 5c, the communication of the members has changed as well. Members 504c, 505c and 503c, 506c communicate with each other, whereas member 506c is not involved in any communication in this phase. It can be possible to withdraw this member from the process. For future planning, it can be possible to leave the position of member 506c vacant in the phase of the process which is illustrated in FIG. 5c.

What is claimed is:

1. A system for tracking communication between at least two members, the system comprising:
    a central monitoring unit that monitors a communication event between the members, wherein the monitoring unit determines communication information from the communication event;
    a tracking unit that extracts from the communication information selected communication event information;
    a mobile identification unit that automatically identifies a member of the at least two members and second communication information during a personal communication; and
    a storage unit that stores the selected communication event information.

2. The system of claim 1, further comprising a visualization unit that determines from the storage unit, stored selected communication event information together with at least member information, and that displays visualizations, of the selected communication event information and the member information.

3. The system of claim 2, wherein the visualization unit displays the selected communication event information and the member information for the communication event between the members depending on at least one of:
    a frequency of communication between the members;
    a type of communication between the members.

4. The system of claim 1, wherein the mobile identification unit is at least one of:
    a radio frequency identification unit; and
    Bluetooth communication unit.

5. The system of claim 1, further comprising at least one interrogator that interrogates the mobile identification unit, retrieves at least the stored selected communication event information from the storage unit, and forwards the retrieved selected communication event information to the monitoring unit.

6. A method for tracking communication between at least two members, the method comprising:
    monitoring, with a central monitoring unit operating on a computer, a communication event between the members and determining communication information from the monitored communication event, wherein the members are provided with mobile identification units that identify the members during a personal communication event;
    extracting, with a tracking unit operating on the computer, from the communication information selected communication event information related to the communication event, the selected communication event information selected from at least one of process information and member information; and
    storing, at the computer, at least one of the process information and the member information.

7. The method of claim 6, wherein the selected communication event information comprises the role information of the members involved in the communication event.

8. The method of claim 6, wherein storing, at the computer, at least one of the process information and member information comprises storing, at the computer, a matrix of members and communication events.

9. The method of claim 6, wherein the selected communication event information comprises the length of the communication event.

10. The method of claim 6, wherein storing, at the computer, at least one of the process information and member information comprises storing, at the computer, a frequency of communication events occurring between members.

11. The method of claim 6, wherein the selected communication event information comprises a type of communication event.

12. The method of claim 6, wherein extracting, with a tracking unit operating on the computer, selected communication event information related to the communication event comprises extracting, with the tracking unit operating on the computer, at least one type of communication event information selected from the group comprising:
    telephone communication;
    email communication;
    intercommunication between programs and persons;
    web communication; and
    personal communication.

13. The method of claim 6, further comprising displaying, on an output device, a visualization of process-related communication events together with at least the member information.

14. The method of claim 13, wherein displaying, on an output device, the visualization comprises displaying, on the output device, a pictorial representation of the members involved in the communication events for a particular process and a pictorial representation of intercommunication between the members.

15. The method of claim 13, wherein displaying, on an output device, the visualization comprises displaying, on the output device, the communication events between the members depending on at least one of:
    a frequency of communication between the respective members; and
    a type of communication between the respective members.

16. The method of claim 6, further comprising receiving, at the computer, location information from the mobile identification units, and wherein storing, at the computer, at least one of the process information and member information comprises storing location information.

17. The method of claim 6, further comprising interrogating the mobile identification units for retrieving at least the selected communication event information.

18. The method of claim 17, further comprising forwarding at least the retrieved selected communication event information to the central monitoring unit operating on the computer.

19. A computer readable medium storing instructions thereon, which, when executed by one or more processors, cause the one or more processors to perform operations comprising:
  monitoring communication events between at least two members and determining communication information from the monitored communication event, wherein the members are provided with mobile identification units that identify the members during a personal communication event;
  extracting, from the communication information, member information and process information related to the communication event;
  storing the member information and the process information; and
  displaying visualizations of the member information and the process information.

20. A method for tracking communication between at least two members, the method performed by a processor under control of a computer program product, the method comprising:
  monitoring, with a processor-implemented monitoring unit, a communication event between the members and determining communication information from the monitored communication event, wherein the communication information comprises the length of the communication event;
  extracting, with a processor-implemented tracking unit, from the communication information selected communication event information related to the communication event, the selected communication event information selected from at least one of process information and member information; and
  storing, in memory, at least one of the process information and the member information.

21. A method for tracking communication between at least two members, the method performed by a computer system having a monitoring unit, a tracking unit, and a storage unit, the method comprising:
  monitoring, with the monitoring unit, a communication event between the members and determining communication information from the monitored communication event;
  extracting, with the tracking unit, from the communication information selected communication event information related to the communication event, the selected communication information selected from at least one of process information and member information;
  storing, at the storage unit, at least one of the process information and the member information; and
  storing, at the storage unit, a frequency of communication events occurring between the members.

* * * * *

UNITED STATES PATENT AND TRADEMARK OFFICE
CERTIFICATE OF CORRECTION

PATENT NO. : 7,606,162 B2 Page 1 of 1
APPLICATION NO. : 11/027565
DATED : October 20, 2009
INVENTOR(S) : Herter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1330 days.

Signed and Sealed this

Fifth Day of October, 2010

David J. Kappos
*Director of the United States Patent and Trademark Office*